(12) United States Patent
Relph

(10) Patent No.: US 11,592,122 B2
(45) Date of Patent: Feb. 28, 2023

(54) HYDRAULIC HOSE CLAMP

(71) Applicant: Great Plains Manufacturing, Inc., Salina, KS (US)

(72) Inventor: John M. Relph, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 17/751,753

(22) Filed: May 24, 2022

(65) Prior Publication Data
US 2022/0282805 A1 Sep. 8, 2022

Related U.S. Application Data

(63) Continuation of application No. 16/365,821, filed on Mar. 27, 2019, now Pat. No. 11,384,867.

(51) Int. Cl.
*F16L 3/22* (2006.01)
*F16L 3/12* (2006.01)
*E02F 9/22* (2006.01)

(52) U.S. Cl.
CPC ........... *F16L 3/1211* (2013.01); *E02F 9/2275* (2013.01)

(58) Field of Classification Search
CPC . F16L 3/1211; F16L 3/00; F16L 3/015; F16L 3/08; F16L 3/10; F16L 3/1008; F16L 3/1016; F16L 3/1041; F16L 3/1058; F16L 3/1091; F16L 3/12; F16L 3/1207; F16L 3/1233; F16L 3/137; F16L 3/22; F16L 3/221; F16L 3/2235; F16L 3/23; F16L 3/233; E02F 9/2275
USPC ................ 285/62; 248/637, 65, 68.1, 73, 75
See application file for complete search history.

(56) References Cited

U.S. PATENT DOCUMENTS

| | | | | |
|---|---|---|---|---|
| 3,634,608 A | * | 1/1972 | Buhl ................... | H02G 3/0658 16/2.5 |
| 3,872,881 A | * | 3/1975 | Miller ................... | E02F 9/2275 280/421 |
| 5,108,253 A | * | 4/1992 | Kobayashi ............ | E02F 9/2271 414/694 |
| 5,115,542 A | * | 5/1992 | Gehres .................. | H02G 3/263 24/339 |

(Continued)

OTHER PUBLICATIONS

New Line Hose & Fittings—TR-CHS Heavy Duty Clamp with Rubber Inserts, https://www.new-line.com/clamps/hose-and-tube-supports/hydraulic-tube-supports-clamps-cushions-complete-sets/heavy-duty-clamp-with-rubber-inserts; 2019, 5 pages.

(Continued)

*Primary Examiner* — Todd M Epps
(74) *Attorney, Agent, or Firm* — Hovey Williams LLP; Kameron D. Kelly

(57) ABSTRACT

A hose clamp for supporting a hose with respect to a machine. The hose clamp may include a deformable clamping element comprising a section of material at least partially surrounding an opening. The opening extends through a thickness of the clamping element and is configured to receive the hose. The hose clamp additionally comprises a support element configured to secure the clamping element to the machine. The support element is further configured to compress the clamping element along a direction of the thickness of the clamping element, thereby deforming the clamping element and causing the clamping element to constrict around the hose.

20 Claims, 10 Drawing Sheets

(56) References Cited

U.S. PATENT DOCUMENTS

| | | | | |
|---|---|---|---|---|
| 6,758,024 | B1* | 7/2004 | Mieger | E02F 3/38 |
| | | | | 52/839 |
| 8,770,537 | B2 | 7/2014 | Go | |
| 11,384,867 | B2* | 7/2022 | Relph | F16L 57/06 |
| 2005/0109885 | A1* | 5/2005 | Welsh | F16L 59/02 |
| | | | | 248/56 |
| 2007/0120023 | A1* | 5/2007 | Martinez | F16L 3/22 |
| | | | | 248/68.1 |
| 2010/0158653 | A1* | 6/2010 | Webb | E02F 9/2275 |
| | | | | 414/722 |
| 2014/0265157 | A1* | 9/2014 | Mukai | F16L 5/08 |
| | | | | 277/606 |
| 2015/0369396 | A1* | 12/2015 | Handa | F16B 5/08 |
| | | | | 248/65 |
| 2018/0163900 | A1* | 6/2018 | Vaughn | F16L 5/00 |
| 2019/0285201 | A1* | 9/2019 | Ruiz | F16L 23/10 |

OTHER PUBLICATIONS

Author Unknown; How to Replace a Hydraulic Hose, wikiHow, https://www.wikihow.com/Replace-a-Hydraulic-Hose, 5 pages.

\* cited by examiner

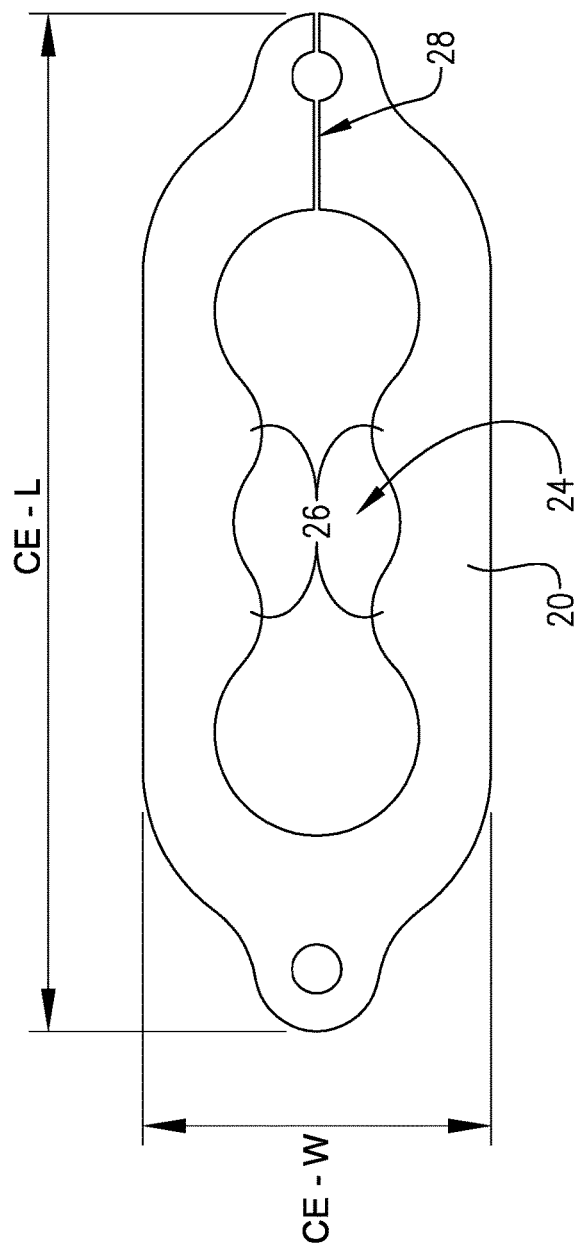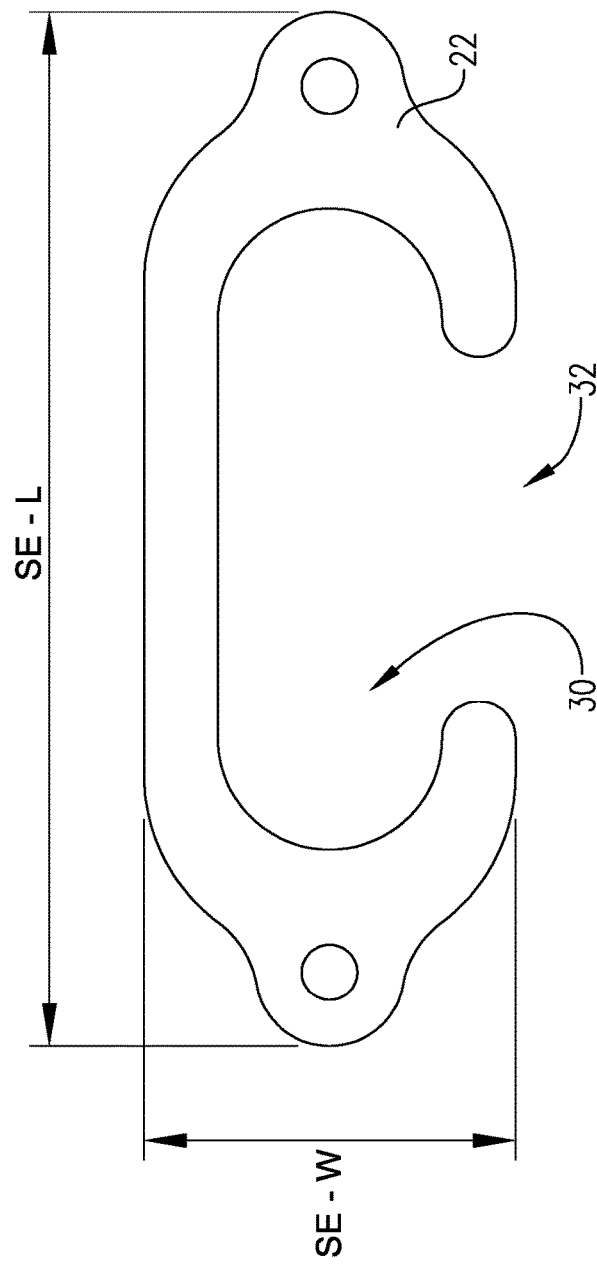
FIG. 6
FIG. 8

HYDRAULIC HOSE CLAMP

RELATED APPLICATION

This continuation patent application claims priority to U.S. patent application Ser. No. 16/365,821 entitled "HYDRAULIC HOSE CLAMP," filed Mar. 27, 2019, the entire disclosure of which is incorporated herein by reference.

FIELD OF THE INVENTION

Embodiments of the present invention are generally directed to hose clamps. More particularly, embodiments of the present invention are directed to hose clamps that can be used to support hydraulic hoses with respect to machines, such as heavy-equipment machines.

BACKGROUND OF THE INVENTION

Many types of heavy-equipment machines include hydraulic systems to power the machines, as well as to provide power to arms and to implements associated with the machines. For example, skid steers and/or track loaders ("loaders") are often operated with implements that are supported by the loaders' lift arms. The lift arms of a loader can raise and lower the associated implement, such that the implement can perform various types of work (depending on the specific type of implement being used). Generally, the lift arms will be actuated hydraulically via one or more hydraulic cylinders. Commonly, the implement will also be hydraulically operated. As such, the loader will include a plurality of hydraulic hoses that extend from the hydraulic pump and/or hydraulic valves of the loader to the hydraulic cylinders of the lift arms and/or to the implement supported by the lift arms.

Proper routing and support of hydraulic hoses is important for enhancing the durability and longevity of the hydraulic hoses. For example, if a hydraulic hose is positioned in a manner that allows the hydraulic hose to make contact with and/or to rub against the loader when the loader (or the loader's lift arms) actuate, such contact can cause the hydraulic hose to prematurely wear, which can cause early failure of the hydraulic hose.

SUMMARY OF THE INVENTION

In one embodiment of the present invention, there is provided a hose clamp for supporting a hose with respect to a machine. The hose clamp may include a clamping element comprising a section of material at least partially surrounding an opening. The opening extends through a thickness of the clamping element and is configured to receive the hose. The hose clamp additionally comprises a support element configured to secure the clamping element to the machine. The support element is further configured to compress the clamping element along a direction of the thickness of the clamping element, thereby deforming the clamping element and causing the clamping element to constrict around the hose.

In an additional embodiment, there is provided a machine comprising at least one lift arm, at least one hydraulic hose extending into an interior of the lift arm, and a hose clamp supporting the hydraulic hose with respect to the lift arm. The hose clamp includes a deformable clamping element comprising a section of material at least partially surrounding an opening. The opening extends through a thickness of the clamping element and receives the hydraulic hose. The hose clamp additionally includes a support element securing the clamping element to the lift arm. The support element compresses the clamping element along a direction of the thickness of the clamping element, thereby deforming the clamping element and causing the clamping element to constrict around the hydraulic hose.

In a further embodiment, there is provided a method of supporting a hydraulic hose with respect to a machine. The method comprising a step of providing a hose clamp comprising a deformable clamping element formed as a section of material at least partially surrounding an opening, with the opening extending through a thickness of the clamping element. The method comprises the additional step of inserting the hydraulic hose into the opening of the clamping element. The method comprises the further step of compressing the clamping element along a direction of the thickness of the clamping element. During the compressing step, the clamping element deforms and constricts around the hydraulic hose.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 5a is a perspective view of the clamping element from FIG. 5, with the clamping element being unflexed in a closed position;

FIG. 6 is a top plan view of a clamping element from the hose clamp of FIGS. 1-3;

FIG. 8 is a top plan view of a support element from the hose clamp of FIGS. 1-3;

Figure 1:
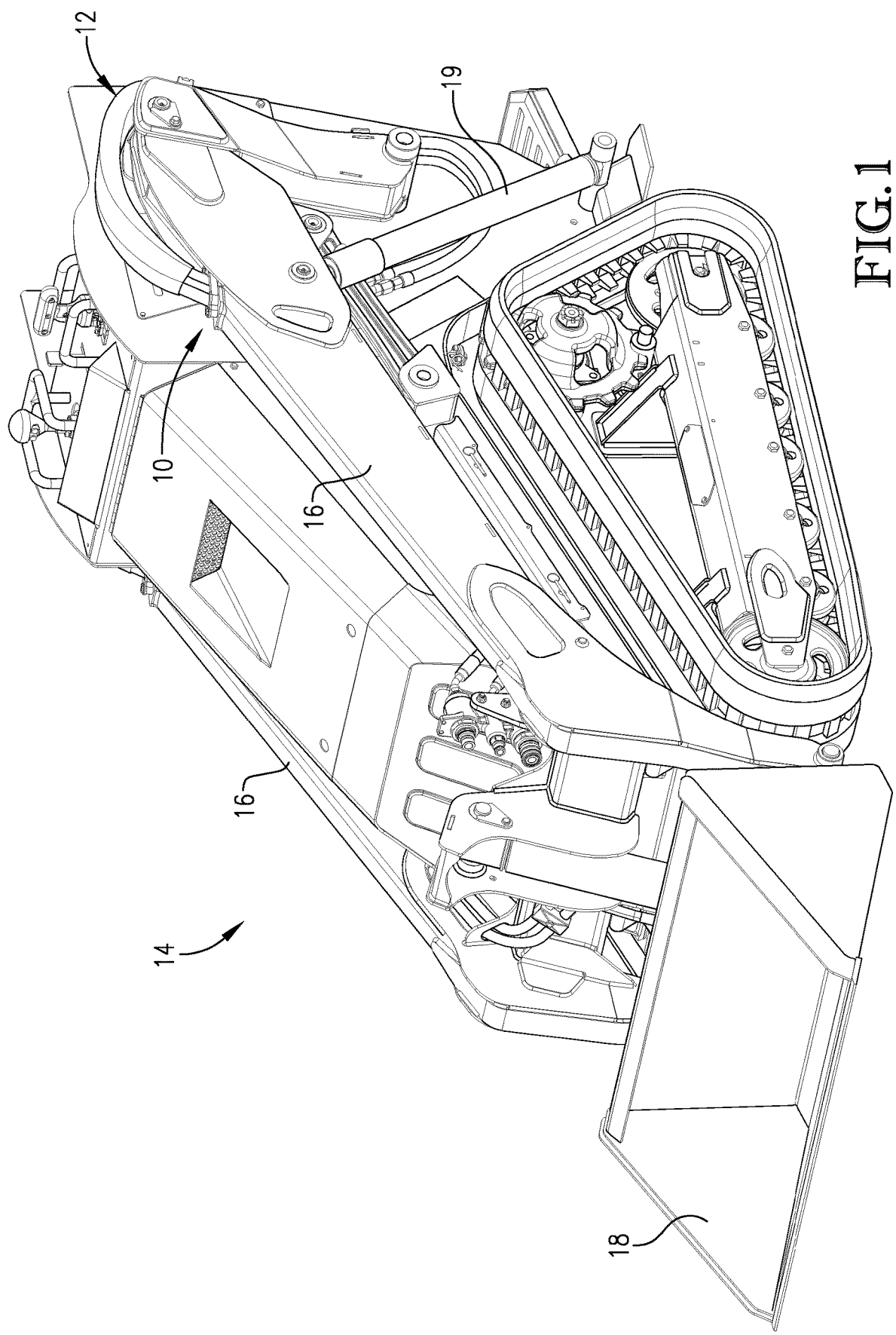
FIG. 1 is a front perspective view of a heavy-equipment machine with a pair of lift arms and an implement powered hydraulically by way of a plurality of hydraulic hoses, with the hydraulic hoses held in place by a hose clamp according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Broadly, as illustrated in FIG. 1, embodiments of the present invention are directed to a hose clamp 10 for supporting one or more hoses 12 (e.g., hydraulic hoses) with respect to a heavy-equipment machine 14 (e.g., a skid steer and/or track loader). Although the following description describes the hose clamp 10 supporting hydraulic hoses 12, it should be understood that the hose clamp 10 of embodiments of the present invention may be used to support other types of hoses, such as gas hoses (e.g., pneumatic lines), other liquid hoses (e.g., water lines, fuel lines, etc.), or the like. In addition, although the heavy-equipment machine 14 described herein is directed towards a skid steer and/or track loader, it should be understood that the hose clamp 10 of embodiments of the present invention may be used with various other types of heavy-equipment machines 14, or with non-vehicular machines (e.g., engines, power plants, hydraulic presses, assembly lines, etc.).

As illustrated in FIG. 1, the heavy-equipment machine 14 (referred herein as "machine 14") may include a pair of lift arms 16 that support an implement 18. The lift arms 16 may each be associated with one or more hydraulic cylinders 19, which facilitate actuation (e.g., raising and lowering) of the lift arms 16. The machine 14 may include one or more of such hydraulic hoses 12 extending from the hydraulic system of the machine 14 (e.g., the hydraulic pump/valve(s), which is not shown) to the hydraulic cylinders 19 to facilitate such actuation. As such, for instance, the lift arms 16 can be actuated via the hydraulic cylinders 19 to raise and/or lower the implement 18. The machine 14 may also be coupled with various types of implements 18 for performing various types of work. For example, as shown in FIG. 1, the implement 18 is a bucket, which is operable to pick up and dump material (e.g., soil). The implement 18 may require hydraulic power to actuate and/or operate the implement 18. As such, the machine 14 may include one or more of such hydraulic hoses 12 extending from the hydraulic system of the machine 14 to the implement 18 (or to a position adjacent to the implement 18). For example, in certain embodiments, the implement 18 may comprise an implement that requires hydraulic power to operate, such as an auger, a post-hole digger, a tiller, or the like. In such embodiments, the hydraulic hoses 12 may connect with a cylinder or a motor of the implement 18 so as to provide hydraulic power to the implement 18.

Figure 2:
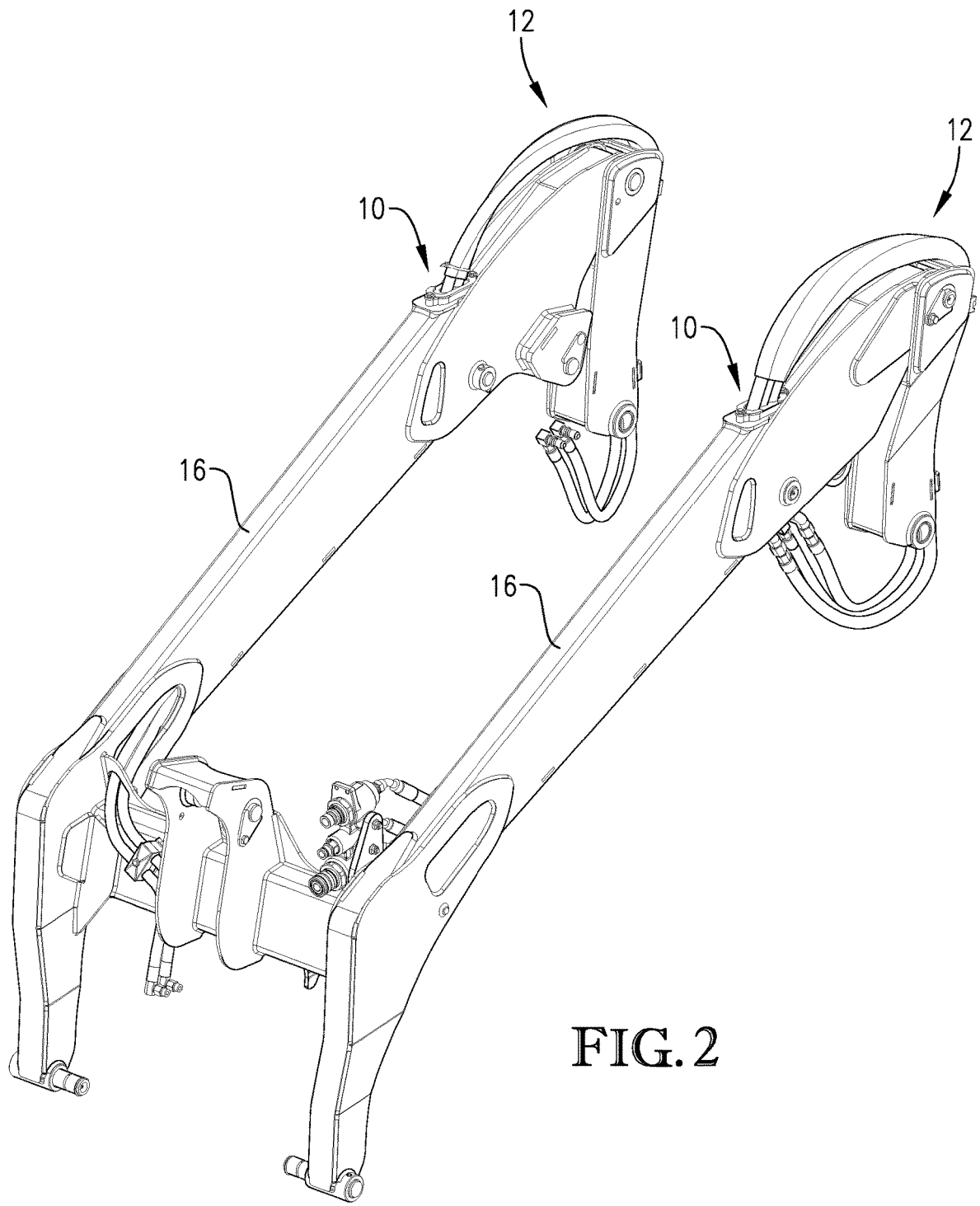
FIG. 2 is a front perspective view of the pair of lift arms, the plurality of hydraulic hoses, and the hose clamps from FIG. 1.
Figure 3:
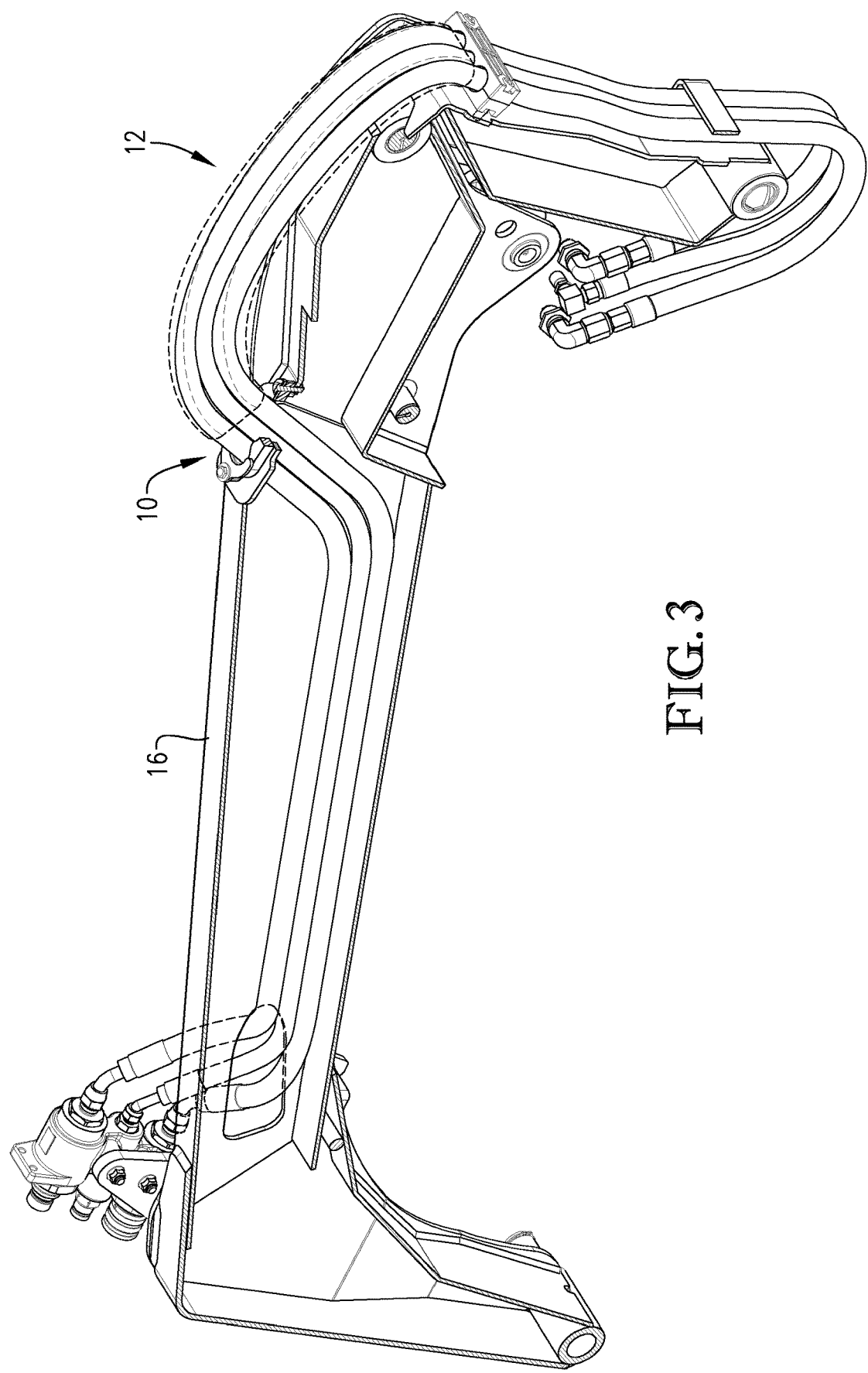
FIG. 3 is a cross sectional perspective view of one of the lift arms from FIGS. 1 and 2, particularly showing one of the hose clamps supporting hydraulic hoses in place with respect to the lift arm as the hydraulic hoses extend through an interior space of the lift arm.

In some embodiments, the hydraulic hoses 12 that extend to the implement 18 (and/or those hydraulic hoses 12 that are connected to the hydraulic cylinder 19 of the lift arms 16) may be inserted into an interior space of the lift arms 16. For example, as perhaps best illustrated in FIGS. 2 and 3, the hydraulic hoses 12 can pass through at least a portion of the interior of the lift arms 16 as the hydraulic hoses 12 extend from the hydraulic system of the machine 14 to their intended locations (e.g., to the implement 18 and/or to the hydraulic cylinders 19 of the lift arms 16). Extending through the interior space of the lift arms 16 may be beneficial in that the hydraulic hoses 12 will not be exposed to the environment and/or will not come into unwanted contact with the machine 14 and/or with external objects, which could cause wear and damage to the hydraulic hoses 12.

Figure 4:
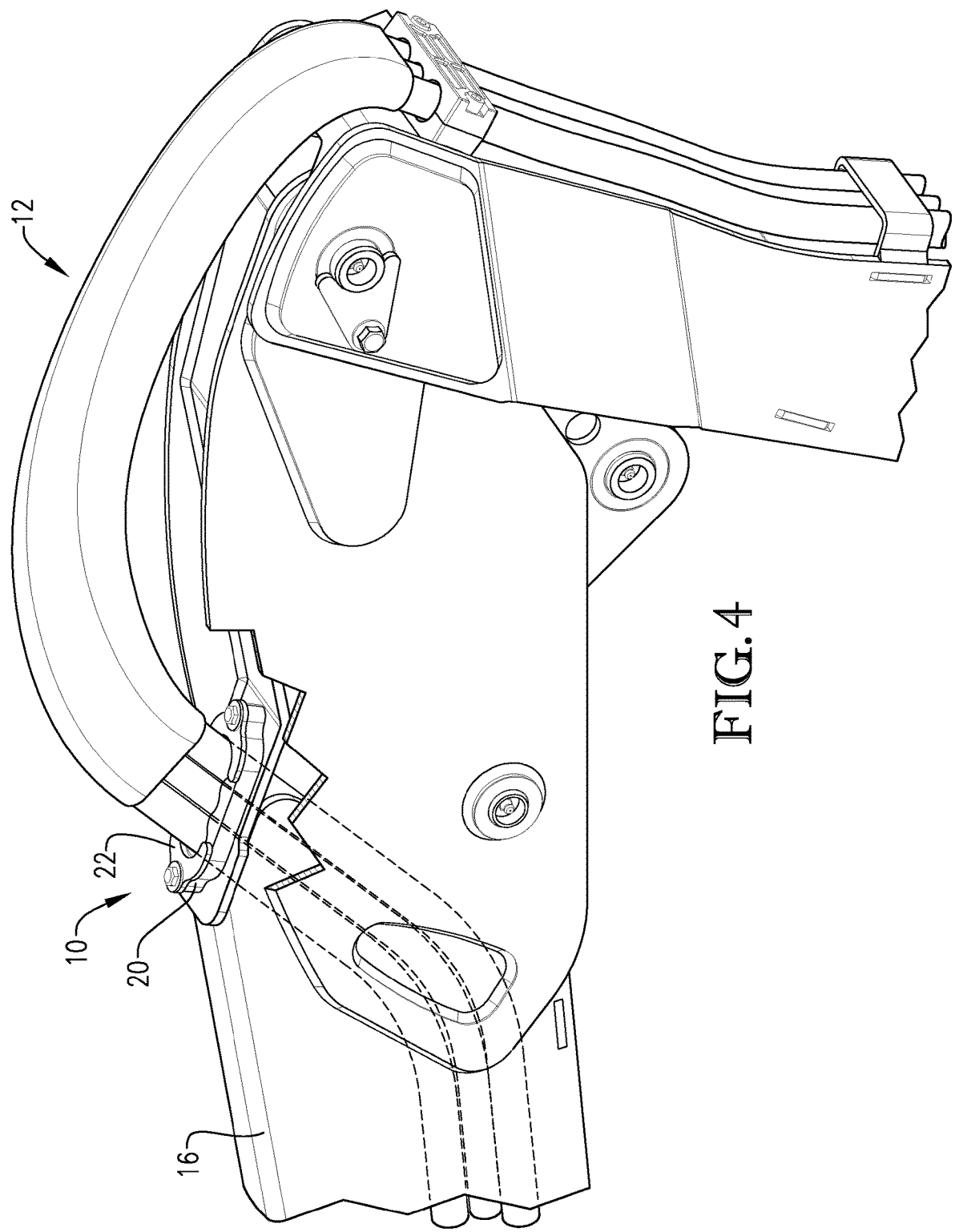
FIG. 4 is an enlarged, perspective view of a portion of one of the lift arms from FIG. 2, particularly illustrating the hose clamp supporting the hydraulic hoses with respect to the lift arm.
Figure 5:
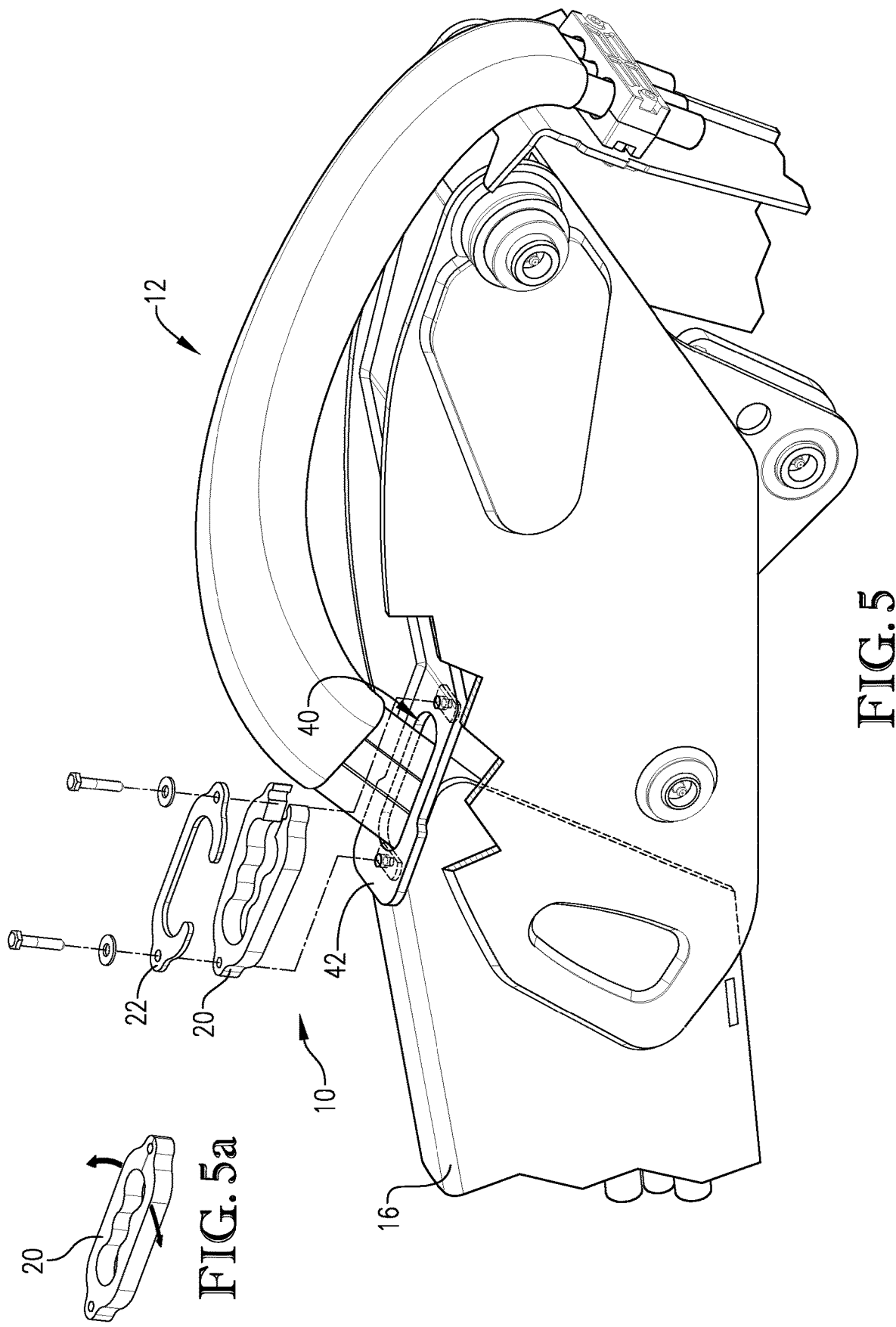
FIG. 5 is another enlarged, perspective view of a portion of one of the lift arms from FIG. 2, particularly illustrating the hose clamp in exploded form and with a clamping element of the hose clamp being flexed outward in an open position.

The hose clamps 10 of embodiments of the present invention may be configured to support one or more of the hydraulic hoses 12 with respect to the machine 14, and particularly may support the one or more hydraulic hoses 12 in position with respect to the lift arm 16 of the machine 14 (e.g., as the hydraulic hoses 12 pass into the interior spaces of the lift arms 16). In more detail, and with reference to FIGS. 4 and 5, the hose clamp 10 may broadly comprise a clamping element 20 configured to constrict around the hydraulic hoses 12 and a support element 22 configured to secure the clamping element 20 to the machine 14 (e.g., to one of the lift arms 16 of the machine 14). In some embodiments, the clamping element 20 may be formed as a section of material, such as an elongated, flat loop of material, that surrounds an opening 24, as illustrated in FIG. 6. As such, the clamping element 20 may be configured similarly to and/or the same as, a gasket. In certain embodiments, the clamping element 20 may be configured as a closed loop. In other embodiments, the clamping element 20 may be formed as an open loop of material, such as a u-shaped, a c-shaped, or other similarly open-shaped section of material. Regardless, the opening 24 of the clamping element 20 may be configured to extend through a thickness of the clamping element 20, as perhaps best shown in FIG. 7. As such, and as will be described in more detail below, the opening 24 of the clamping element 20 is configured to receive one or more of the hydraulic hoses 12. It should be additionally noted that, in some embodiments, the clamping element 20 is configured to flex from a closed position to an open position. FIG. 5 illustrates the clamping element 20 flexed to an open position, while FIG. 5a illustrates the clamping element 20 unflexed and in a closed position.

Figure 7:
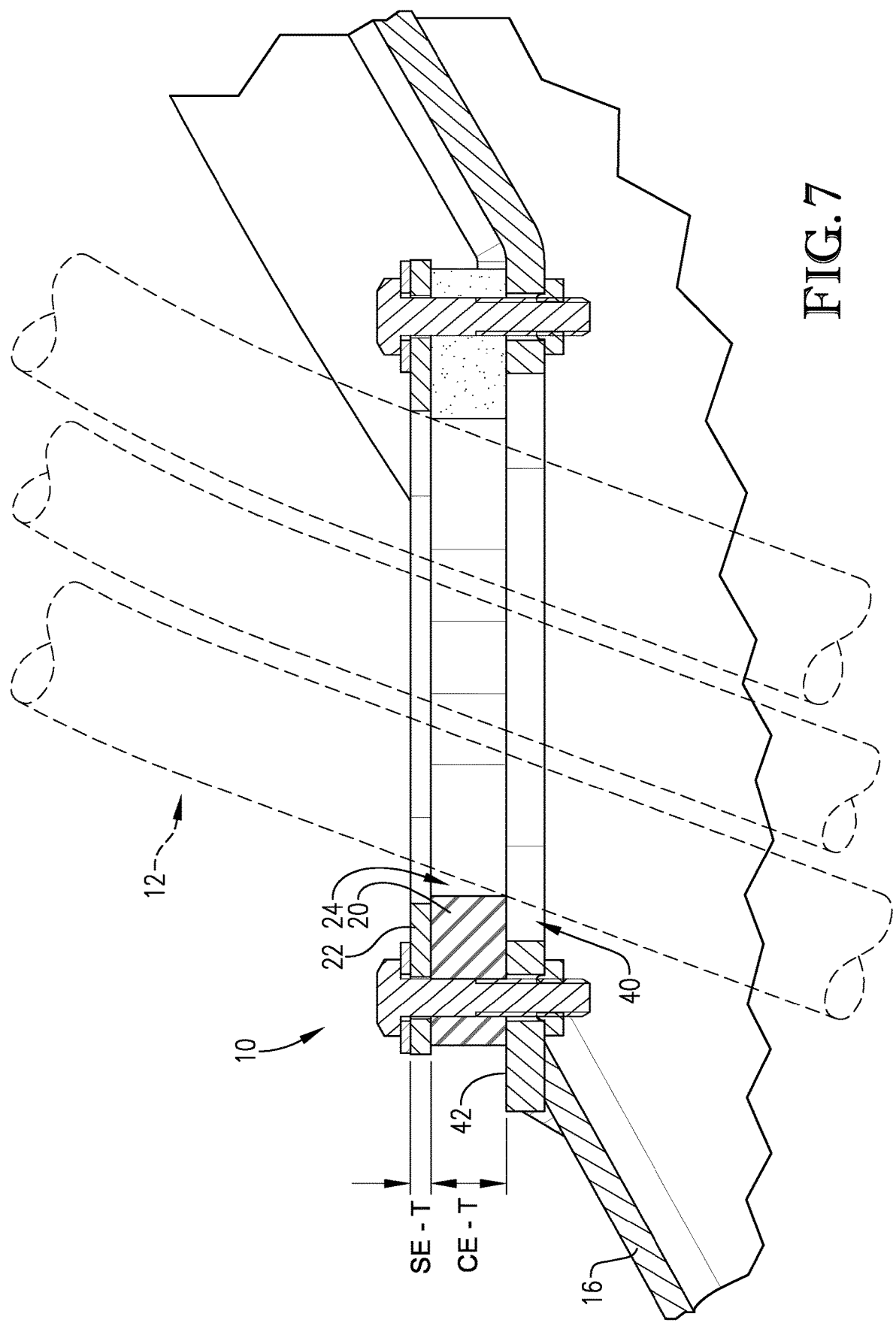
FIG. 7 is an enlarged, cross section view of the lift arm from FIG. 4, particularly showing the hose clamp supporting the hydraulic hoses, and with a clamping element from the hose clamp being in an uncompressed state.

The clamping element 20 may, in some embodiments, be comprised of various types of elastomeric materials, such as rubber, silicone, and/or various other types of polymers. As illustrated in FIG. 6, the clamping element 20 may, in some embodiments, have a width "CE-W" of between 0.5 and 4 inches, between 1 and 3 inches, between 1.5 and 2 inches, or about 1.75 inches. The clamping element 20 may, in some embodiments, have a length "CE-L" of between 3 and 7 inches, between 4 and 6 inches, or about 5 inches. As illustrated in FIG. 7, the clamping element 20 may have a thickness "CE-T" of between 0.25 and 1.0 inches, between 0.33 and 0.66 inches, or about 0.5 inches. The opening 24 presented within the clamping element 20 may be large enough to receive, support, and constrict the hydraulic hoses 12. As such, in some embodiments, the opening 24 of the clamping element 20 may have a width of between 0.5 and 1.5 inches or about 1 inch and a length of between 2 and 4 inches or about 3 inches. Nevertheless, it should be understood that such above-described dimensions may be varied as necessary to comport with the specific measurements of the hydraulic hoses 12 being supported by the hose clamp 10.

Embodiments provide for the opening 24 to be defined by an interior surface of the clamping element 20. In certain embodiments, the opening 24 will be configured to receive a single hydraulic hose 12. Alternatively, as illustrated in FIG. 6, the interior surface of the clamping element 20 may be formed with an arcuate shape that defines the opening 24 to include two or more hose-receiving areas, with each hose-receiving area being configured to receive an individual hydraulic hose 12. For instance, in some specific embodiments, the clamping element 20 may be formed with three hose receiving areas, which are configured to receive three individual hydraulic hoses 12. In some embodiments, the interior surface of the clamping element 20 may include a plurality of knobs 26 projecting inwardly into the opening 24. Such knobs 26 may be configured to separate adjacent hose-receiving areas.

To facilitate the ability to receive the hydraulic hoses 12 within the opening 24 of the clamping element 20, the clamping element 20 may include an aperture 28 formed through one side of the clamping element 20. As such, the clamping element 20 can be flexed or spread out from a closed position (as shown in FIG. 5a) to an open position (as shown in FIG. 5), such that the hydraulic hoses 12 can be inserted through the aperture 28 and into the opening 24 of the clamping element 20.

Turning to the support element 22, as illustrated in FIG. 8, embodiments may provide for the support element 22 to comprise a generally flat plate that includes a centrally-positioned opening 30 formed through a thickness of the support element 22. The support element 22 may be formed from a rigid material, such as a metal, a metal alloy, a hard polymer, or the like. As initially noted, the support element 22 may be used to secure the clamping element 20 to the machine 14, as illustrated in FIG. 4. Specifically, the support element 22 may be configured to cover the clamping element 20 when integrated with the machine 14, such that the clamping element 20 is sandwiched between the machine 14 (or the lift arm 16 of the machine 14) and the support element 22.

As such, the support element 22 may be formed with a size and shape that generally corresponds with a top surface of the clamping element 20. For instance, the support element 22 may be formed with a size in which, when the support element 22 is positioned on a top surface of the clamping element 20, a perimeter of the support element 22 is generally the same as (or slightly larger than) a perimeter of the clamping element 20. For example, as illustrated in FIG. 8, the support element 22 may, in some embodiments have a width "SE-W" of about 1.5 to 2.0 inches and a length "SE-L" of about 4 to 6 inches. In contrast from the clamping element 20, however, the support element 22 may be formed with a relatively small thickness. As illustrated in FIG. 7, the support element 22 may have a thickness "SE-T" of between 0.1 and 0.25 inches, or about 0.13 inches.

In additional embodiments, interior portions of the support element 22 may not extend inward as far as interior portions of the clamping element 20. Stated differently, when the support element 22 is positioned on the top surface of the clamping element 20, the opening 30 of the support element 22 may be positioned directly over interior portions of the clamping element 20 (including the interior surface of the clamping element 20 that defines the opening 24 of the clamping element 20). As a result, when the clamping element 20 is compressed by the support element 22, as will be described in more detail below, the material of the clamping element 20 can expand inward so as to contract the width of the opening 24 of the clamping element 20 as necessary to contract and/or constrict around the hydraulic hoses 12.

In some embodiments, as shown in FIG. 8, the support element 22 may be formed as c-shaped section of material at least partially enclosing the opening 30. To facilitate entry of the hydraulic hoses 12 into the opening 30 of the support element 22, the support element 22 may include an aperture 32 formed through one side of the support element 22. As such, the hydraulic hoses 12 can be inserted through the aperture 32 and into the opening 30 of the support element 22. In alternative embodiments, the support element 22 may be formed as a closed, elongated loop of material that encloses the opening 30.

In operation, the hose clamp 10 can be used to support one or more hydraulic hoses 12 with respect to the machine 14, and in some embodiments with respect to the lift arms 16 of the machine 14. To begin, the hydraulic hoses 12 may be inserted into an interior space of the lift arms 16 via an opening 40, as illustrated in FIG. 5. Next, the hose clamp 10 can be positioned around the hydraulic hoses 12 and secured to the lift arm 16 at a position adjacent to the opening 40 of the lift arm 16, as illustrated in FIG. 5 (the clamping element 20 being positioned around the hydraulic hoses 12) and FIG. 4 (the clamping element 20 positioned around the hydraulic hoses 12 and secured to the lift arm 16 of the machine 14).

Figure 9:
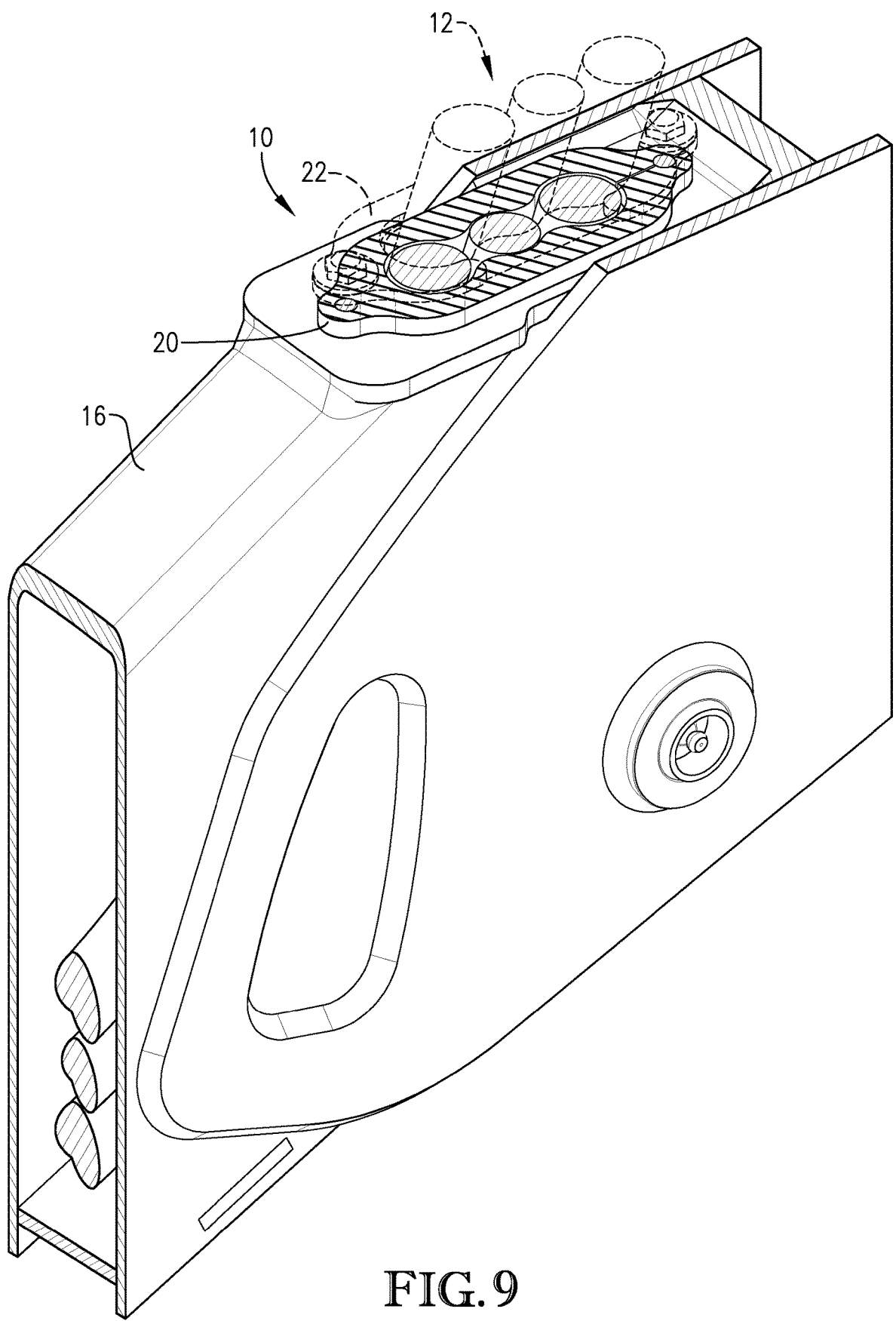
FIG. 9 is a perspective view of the lift arm from FIG. 7, illustrating the clamping element from the hose clamp in the uncompressed state, such that the hydraulic hoses have some freedom of movement.

In more detail, the lift arm 16 may, as illustrated in FIG. 5, include a mating surface 42 that surrounds the opening 40 in the lift arm 16. A bottom surface of the clamping element 20 can be positioned on the mating surface 42, such that the opening 24 of the clamping element 20 is generally aligned with the opening 40 of the lift arm 16, as illustrated in FIG. 7. To allow the clamping element 20 to be positioned on the mating surface 42, the clamping element 20 may need to be flexed to an open position so as to permit the hydraulic hoses 12 to be received in the opening 24 of the clamping element 20. As was described above, the clamping element 20 may be opened by flexing outward, such that the hydraulic hoses 12 can be passed through the aperture 28 of the clamping element 20 and received within the opening 24. In embodiments in which there are multiple hydraulic hoses 12, each individual hydraulic hose 12 can be positioned within a hose-receiving area of the clamping element 20, as is shown in FIG. 9.

It should be understood that the clamping element 20 may initially receive the hydraulic hoses 12 while the clamping element 20 is in an uncompressed configuration (i.e., the support element 22 is not compressing the clamping element 20). The clamping element 20 in an uncompressed state is illustrated in FIGS. 7 and 9. In such a configuration, there may be some free space between the interior surface of the clamping element 20 and the hydraulic hoses 12. Thus, the hydraulic hoses 12 may have some freedom of movement with respect to the clamping element 20 and the machine 14. However, as will be described in more detail below, such freedom of movement may be removed once the clamping element 20 is secured to the machine 14 and compressed by the support element 22.

To secure the clamping element 20 to the lift arm 16 of the machine 14 (as well as to compress the clamping element 20), the support element 22 may be positioned over the clamping element, as shown in FIG. 5, so as to cover the clamping element 20. Specifically, a bottom surface of the support element 22 may be positioned in contact with an upper surface of the clamping element 20. To facilitate such positioning, the support element 22 can be maneuvered such that the hydraulic hoses 12 are passed through the aperture 32 of the support element 22 and received within the opening 30 of the support element. Next, the support element 22 can be fastened to the lift arm 16 in a manner that sandwiches the clamping element 20 between the support element 22 and the lift arm 16, as is shown in FIG. 4. In some embodiments, fasteners may be used. For instance, as illustrated in the figures a pair of bolts may be used to fasten ends of the support element 22 and the clamping element 20 to the lift arm 16. Specifically, as illustrated in FIG. 5, the bolts may pass through aligned receiving holes formed in the ends of the support element 22 and the clamping element 20 and into threaded receiving holes formed in the lift arms 16. A washer may also be used between each fastener and the support element 22.

Figure 10:
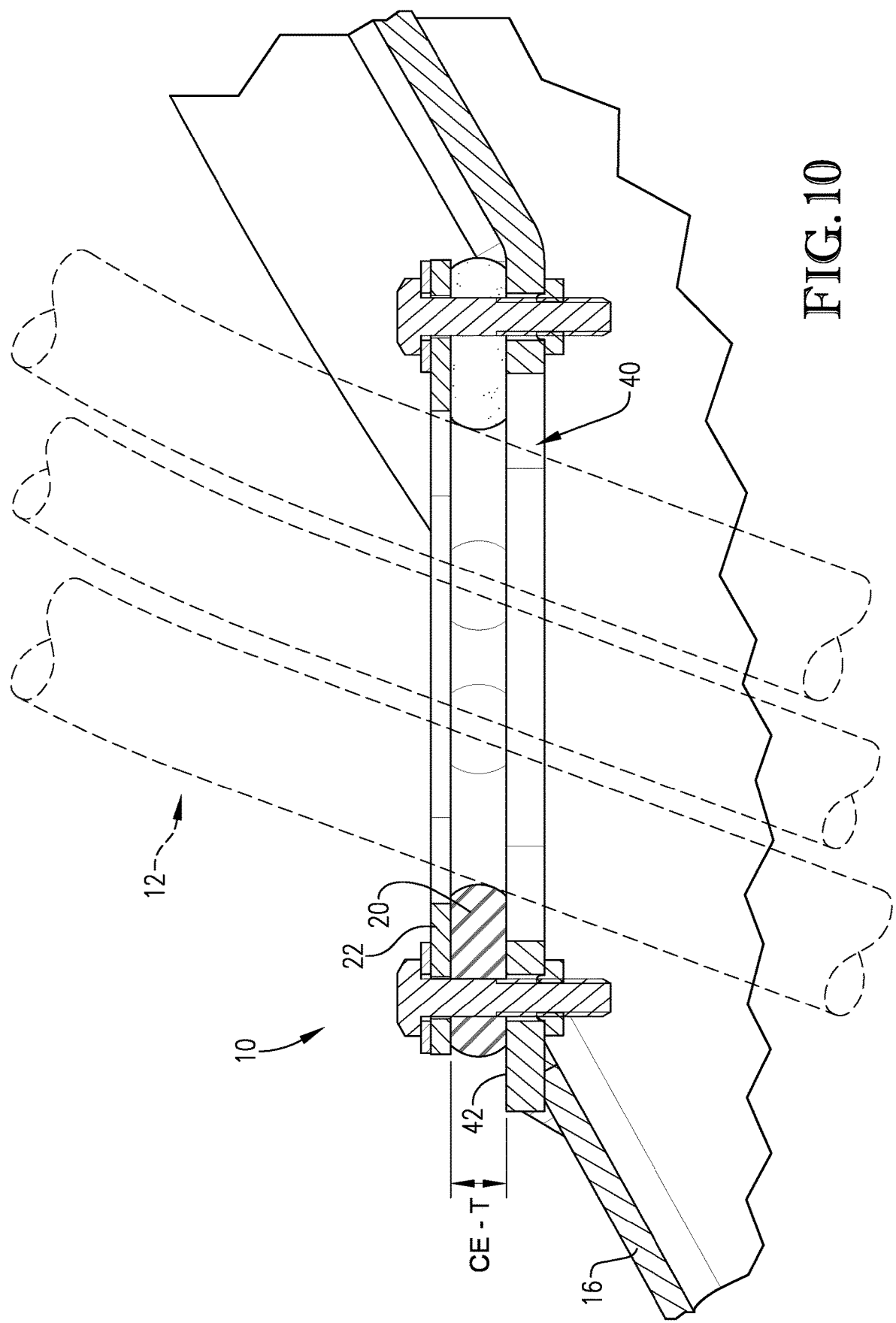
FIG. 10 is an enlarged, cross section view of the lift arm from FIG. 4, particularly showing the hose clamp supporting the hydraulic hoses, and with a clamping element from the hose clamp being in a compressed state.
Figure 11:
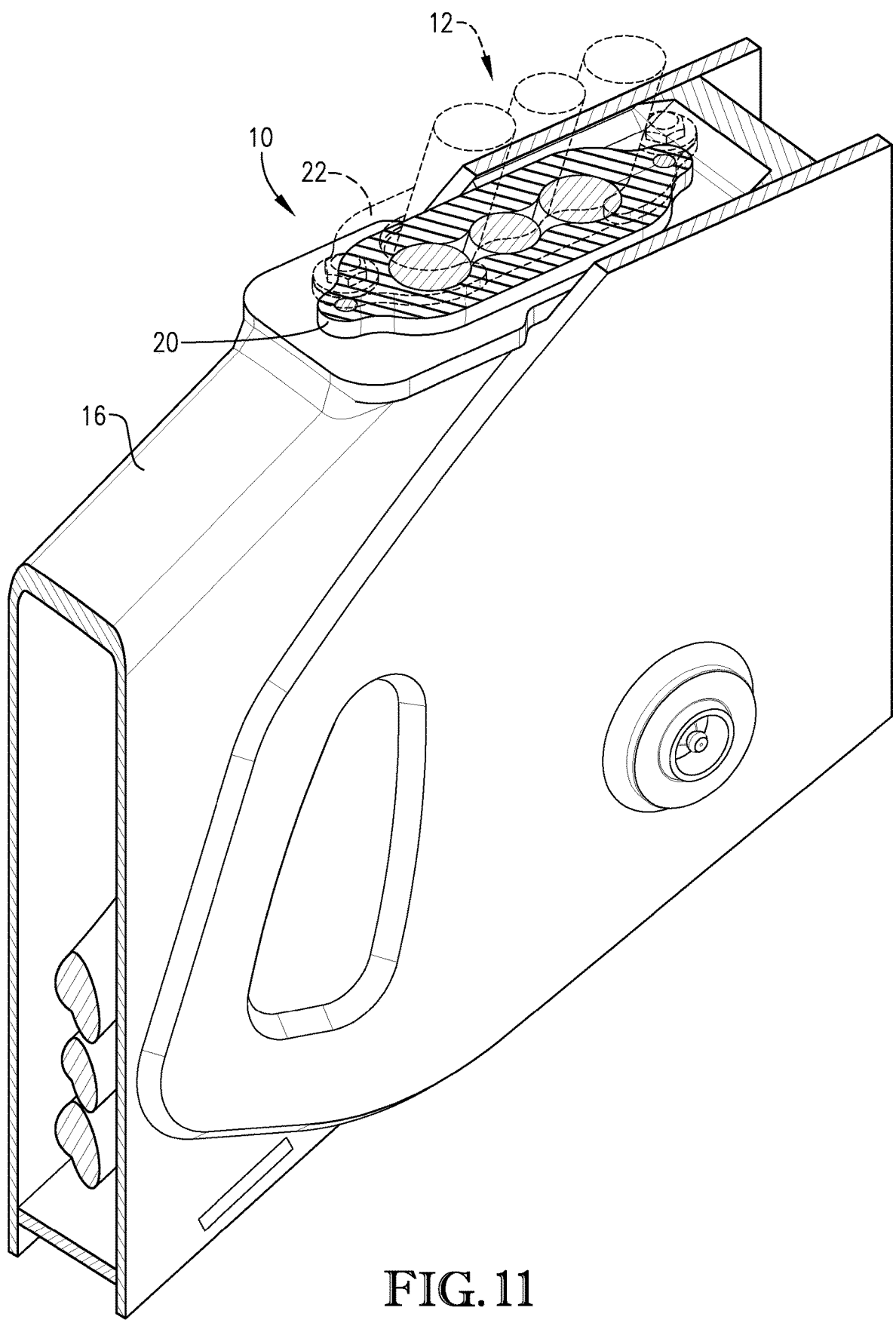
FIG. 11 is a perspective view of the lift arm from FIG. 10, illustrating the clamping element from the hose clamp in the compressed state, such that the hydraulic hoses have no, or minimal, freedom of movement.

In addition to securing the support element 22 and the clamping element 20 to the lift arm 16, the fasteners may also be used to aid the support element 22 in compressing the clamping element 20. Specifically, by threading the fasteners into the lift arm 16, the support element 22 will be forced to move towards to the lift arm 16, thereby compressing the clamping element 20 that is positioned between the support element 22 and the lift arm 16, as illustrated in FIGS. 10 and 11. Such compression of the clamping element 20 may, in some embodiments, be along a direction of the thickness of the clamping element 20 so as to cause at least a portion of the clamping element 20 to reduce its thickness "CE-T." In addition, however, such compression of the clamping element 20 may cause the inward expansion of at least a portion of the clamping element 20. Specifically, the compression may cause the interior surface of the clamping element 20 to expand inward, thereby reducing the size of the opening 24, such that the clamping element 20 constricts around the hydraulic hoses 12, as is shown in FIGS. 10 and 11. Thus, in contrast to the clamping element 20 being in the uncompressed configuration (in which the hydraulic hoses 12 may have some freedom of movement, as shown in FIGS. 7 and 9), the clamping element 20 in the compressed configuration constricts around the hydraulic hoses 12 (as shown in FIGS. 10 and 11) such that there is (1) no (or minimal) free space between the interior surface of the clamping element 20 and the hydraulic hoses 12, and/or (2) the hydraulic hoses 12 are securely held in place, with no (or minimal) freedom of movement, by the clamping element 20.

With the hose clamp 10 securely holding the hydraulic hoses 12 in position with respect to the machine 14 and/or to the lift arm 16 of the machine 14, the hose clamp 10 can reduce the wear and damage to the hydraulic hoses 12. Specifically, the lift arm 16 can be actuated (e.g., raised and lowered) as often as necessary without the hydraulic hoses unnecessarily rubbing on the lift arm 16 or becoming tangled. For instance, if the hose clamp 10 is not used, the hydraulic hoses 12 would have a significant amount of freedom of movement with respect to the lift arm 16, such that the hydraulic hoses would rub against the portion of the lift arm 16 that surrounds the opening 40 in the lift arm. Such contact between the hydraulic hoses 12 and the lift arm 16 would cause unwanted wearing and damage to the hydraulic hoses 12. Such freedom of movement may also permit the hydraulic hoses 12 to become entangled, which may damage the hydraulic hoses 12. In addition to supporting the hydraulic hoses 12, the hose clamp 10 can also function as a seal for the opening 40 in the lift arm 16. Such a seal can prevent (or restrict) environmental debris (e.g., dust, dirt, water, etc.) from entering into the interior space of the lift arm 16.

Although the above description is with respect to a single hose clamp 10 incorporated with a single lift arm 16 of a machine 14, it should be understood that each lift arm 16 of the machine 14 may include a hose clamp 10. Furthermore, the hose clamp 10 may be used with other machines or other components. For instance, in some broad embodiments, the hose clamps 10 may be used whenever it is necessary to pass one or more hoses through a solid surface (e.g., a wall) and to securely hold such hoses in place with respect to the solid surface.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:

1. A method of supporting a hydraulic hose with respect to a machine, said method comprising steps of:
   (a) providing a hose clamp on a lift arm of the machine, wherein the hose clamp comprises a deformable clamping element formed as a section of material at least partially surrounding an opening, wherein the opening extends through a thickness of the clamping element;
   (b) inserting the hydraulic hose through the opening of the clamping element and into an interior space of the lift arm; and
   (c) compressing the clamping element along a direction of the thickness of the clamping element,
       wherein during said compressing of step (c), the clamping element deforms and constricts around the hydraulic hose.

2. The method of claim 1, wherein lift arm comprises a proximal end and a distal end, wherein the distal end of the lift arm is configured to support an implement, and wherein the hose clamp is positioned on the proximal end of the lift arm.

3. The method of claim 2, wherein after said inserting of step (b), the hydraulic hose extends through the interior space of the lift arm from the proximal end towards the distal end.

4. The method of claim 2, wherein the proximal end of the lift arm includes a mating surface, wherein the mating surface surrounds an opening in the lift arm, and wherein the hose clamp is positioned on the mating surface.

5. The method of claim 1, wherein the hose clamp further comprises a support element, wherein said compressing of step (c) further includes securing the clamping element to the machine by fastening the clamping element between the support element and the machine.

6. The method of claim 5, wherein during said compressing of step (c), a width of the opening of the clamping element is reduced.

7. The method of claim 5, wherein during said compressing of step (c), the thickness of the opening of the clamping element is reduced.

8. The method of claim 5, wherein the support element is secured to the machine via threaded fasteners that extend through the support element, through the clamping element, and into the machine.

9. The method of claim 5, wherein the support element comprises a metal plate.

10. The method of claim 9, wherein the support element comprises a flat, c-shaped plate enclosing an opening of the support element, wherein upon said compressing of step (c), the hydraulic hose is received in the opening of the support element.

11. The method of claim 10, wherein the support element includes an aperture formed through one side of the support element, wherein the aperture is configured to permit the hose to pass through the aperture and into the opening of the support element.

12. The method of claim 1, wherein the clamping element comprises an elongated, flat loop of material.

13. The method of claim 1, wherein the clamping element is formed from an elastomeric material.

14. The method of claim 13, wherein the elastomeric material is rubber.

15. The method of claim 1, wherein the opening of the clamping element is defined by an interior surface of the clamping element, wherein the interior surface has an arcuate shape presenting two or more hose-receiving areas, wherein each hose-receiving area is configured to receive an individual hose.

16. The method of claim 15, wherein the interior surface of the clamping element includes a plurality of knobs projecting inwardly into the opening, wherein the knobs separate adjacent hose-receiving areas.

17. The method of claim 1, wherein the clamping element includes an aperture formed through one side of the clamping element, wherein the aperture permits the clamping element to flex open such that the hose can be inserted through the aperture and into the opening of the clamping element.

18. The method of claim 1, wherein the machine is a track loader.

19. The method of claim 18, wherein the track loader supports an implement at a forward end of the lift arm, and wherein the track loader provides hydraulic power to the implement via the hydraulic hose.

20. The method of claim 19, wherein the hydraulic hose exits the interior space of the lift arm at the forward end of the lift arm.

* * * * *